May 14, 1940.  A. H. BEEDE  2,201,118

TRANSMISSION OF POWER

Filed April 6, 1938

INVENTOR
Arnold H. Beede
BY
Blair, Curtis, Dunne & Hayward
ATTORNEYS

Patented May 14, 1940

2,201,118

UNITED STATES PATENT OFFICE 2,201,118

TRANSMISSION OF POWER

Arnold H. Beede, Fairfield, Conn., assignor to Dictaphone Corporation, New York, N. Y., a corporation of New York Application April 6, 1938, Serial No. 200,335

3 Claims. (Cl. 192—84)

This invention relates to apparatus for transmission of power from a continuously operating source of power to mechanism which in ordinary use operates intermittently at the will of the operator, and more particularly is designed to start and stop rotation of the record support of a phonograph.

An object of the invention is to provide a simple and efficient device of the character described which will be positive in action, of rugged construction and compact in form. Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing, in which is shown one of the various possible embodiments of the invention—

Figure 1:
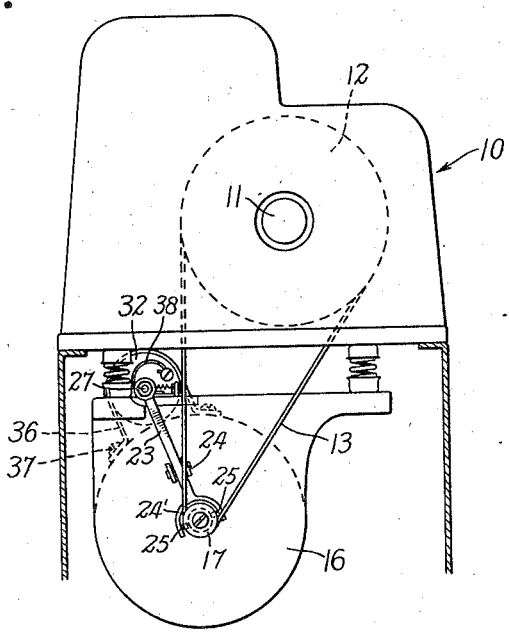
Figure 2:
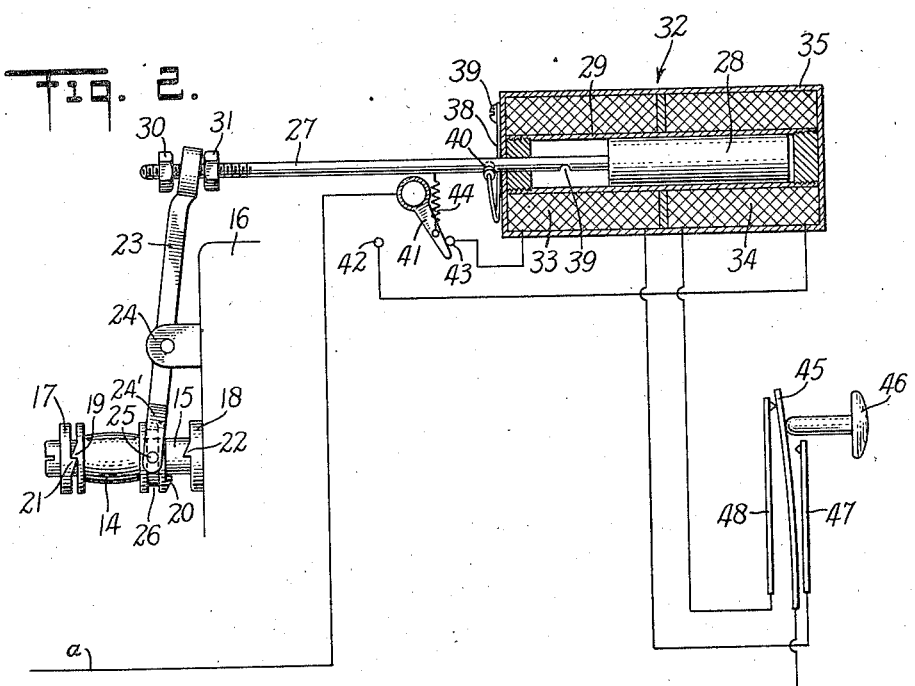

Fig. 1 is an end view of a phonograph and its driving motor, including a preferred form of start and stop mechanism embodying the present invention; and Fig. 2 is a more or less diagrammatic plan view of the said mechanism with wiring diagram showing its electrical control features.

In Fig. 1 there is indicated by the numeral 10 a phonograph of known type having mounted upon its mandrel or record support shaft 11 a fixed pulley 12. This pulley is connected by a drive belt 13 with a pulley 14 mounted upon the shaft 15 of the phonograph drive motor 16. The pulley 14 serves as the shifting member of a clutch forming part of the transmission mechanism which is the subject matter of the present invention.

The clutch pulley 14 is rotatably mounted on the motor shaft 15 and is shiftable along said shaft in one direction into driving engagement with a clutch disc 17 rigidly mounted at the end of the shaft and is also shiftable in the opposite direction into locked engagement with a similar disc 18 rigidly mounted upon the motor frame. Pulley 14 is provided at each end with means such as the teeth 19 and 20 adapted to cooperate with similar teeth 21 and 22 carried respectively by the discs 17 and 18.

For shifting the clutch pulley there is provided a lever 23 pivotally mounted as at 24 in lugs extending outwardly from the motor frame. One end of this lever is formed as a yoke 24' and carries a pair of oppositely disposed pins 25 which fit freely in a circumferential groove 26 formed on the clutch pulley 14 adjacent the end thereof. The other end of lever 23 is apertured loosely to embrace the extended stem 27 of a soft iron solenoid core 28, which is slidable from end to end of a non-magnetic core tube 29. It will be understood that the shifting of the core from one end of its stroke to the other will shift the clutch pulley into engagement with the disc 17 or with the disc 18 as the case may be. The end of lever 23 is held between nuts 30 and 31 threaded upon the end of the stem 27 whereby suitable adjustment may be made in order to establish correct relationship between the pulley and the solenoid core. The solenoid 32 comprises two separate coils 33 and 34 disposed end to end in coaxial relation with the core tube 29, said coils being surrounded by any suitable casing 35.

The solenoid is mounted as a unit upon the motor frame with the stem 27 parallel in respect to the motor shaft 15 and is secured to the motor frame by one or more bands or straps 36 fastened by means of screws 37 to the said frame. A spring detent member 38 secured to the end of the solenoid casing by a screw 39 is adapted resiliently to engage either of the two dwells 39, 40 provided at spaced points along the solenoid core stem 27, the spacing being such that the core with its connections to the pulley 14 will be lightly held in either of its extreme positions.

The current alternately exciting the coils 33 and 34 may be taken from any suitable source over the wires $a$ and $b$. The wire $a$ is connected to the movable contact finger 41 of a single pole double throw switch comprising the finger 41 and two fixed contacts 42 and 43. This switch is of the snap type and is actuated by means of a toggle spring 44 connected at one end to the movable finger 41 and at the other to the solenoid core stem 27, the construction being such that as the stem moves from one end position to the other, the switch contact 41 is snapped from engagement with one of the fixed contacts into engagement with the other thereof immediately after the spring 44 swings across the center line of the finger.

The wire $b$ connects with a movable contact 45 of a single pole double throw switch operated manually by means of a push button 46, or the like. This switch also includes a pair of fixed contacts 47 and 48. The movable contact 45 is normally biased to engage the contact 47 and is moved into contact with 48 by pressing the button 46. When released, contact 45 re-engages contact 47. This switch may be suitably mounted in any location convenient for manual operation of the phonograph.

The coil 33 of the solenoid is connected in a line running from contact 47 of the button switch to contact 43 of the toggle switch, and coil 34 is similarly connected between contact 48 and 42 of the two switches.

The operation of this transmission device, though largely obvious, may be briefly described as follows. Assuming that the clutch is disengaged, the parts being in their alternative positions in respect to the disclosure of Fig. 2, the hand controlled button 46 is pressed closing the circuit through coil 34. Energizing this coil causes the core 28 to be drawn to the right to the position shown in Fig. 2, simultaneously shifting the clutch pulley into engagement with the driving disc 17 on the motor shaft. This engagement immediately starts operation of the phonograph practically at full speed. During this movement of the solenoid core the switch contact 41 is snapped from engagement with 42 onto 43 thus preparing for the excitation of coil 33 as soon as the operator, desiring to stop the machine, releases the button 46. When this happens the core is shifted to its initial position moving the clutch pulley into engagement with the stop plate 18 thus effecting instant cessation of machine operation, and simultaneously again shifting contact finger 41 into engagement with contact 42 preparing the parts for renewed operation when pressure is again applied to the starting button 46. It will be noted that since the current is cut off from whichever coil is activating the solenoid core, before the core reaches the end of its throw in either direction, some means is necessary to hold the clutch in either of its end positions. This means mentioned above is the spring detent 38. This spring engages the dwells on the shaft 27 with just sufficient pressure to hold the clutch member in operative relation either to the disc 17 or the disc 18 while permitting the core to shift without much resistance when the operation of the solenoid is reversed.

It will be seen, therefore, that this invention provides a start and stop mechanism which is quick and positive in action, consumes relatively little electric current and generally attains the objects hereinbefore set forth.

I claim:

1. In a commercial phonograph, the combination of a movable member for operating said phonograph adapted to occupy an operative or inoperative position, a pair of solenoid coils, a circuit system for alternately energizing said coils, a reciprocatory armature member common to said pair of coils, mechanism connected to said armature member for controlling the movement of said movable member to and from said positions, a manually operable control device in said circuit to close the circuit through one solenoid coil to move said movable member to its inoperative position and to close the circuit of said other coil to effect movement of said movable member to its operable position, and a snap action toggle switch directly connected to said armature member and operable thereby only when it has moved beyond mid-position in either direction to open circuit the active coil and to prepare the circuit of the inactive coil for energization when closed by said control device, whereby the active coil is not deenergized and the inactive coil cannot be energized until said armature member is urged further in the direction of its initial movement by the snap action of said switch.

2. In a commercial phonograph, the combination of a movable member for operating said phonograph adapted to occupy an operative or inoperative position, a pair of electromagnets, a circuit system for alternately energizing said magnets, an armature member oppositely affected by said pair of magnets, mechanism connected to said armature member for controlling the movement of said movable member to and from said positions, a control device in said circuit for closing the circuit to one magnet to move said movable member to its inoperative position and for closing the circuit to said other magnet to effect movement of said movable member to its operative position, switch means in said circuit, and resilient means associated with said armature member and said switch means for effecting the operation of said switch means in response to movement of said armature member only when the latter has moved beyond mid-position in either direction to open the circuit to the active magnet and to prepare the circuit of the inactive magnet for energization when closed by said control device, whereby the active magnet is not deenergized and the inactive magnet cannot be energized until said armature member is urged beyond the mid-point of its travel in the direction of its initial movement by the action of said resilient means.

3. In a commercial phonograph, the combination of a movable member for operating said phonograph adapted to occupy an operative or inoperative position, a pair of electromagnets, a circuit system for alternately energizing said magnets, an armature member oppositely affected by said pair of magnets, mechanism connected to said armature member for controlling the movement of said movable member to and from said positions, a control device in said circuit normally biased to close the circuit to one magnet normally to maintain said movable member in its inoperative position and to open the circuit to the other magnet, said control device being manually operable in opposition to said bias to open the circuit to said first magnet and close the circuit to said other magnet to effect movement of said movable member to its operative position, switch means in said circuit, and resilient means associated with said armature member and said switch means for effecting the operation of said switch means in response to movement of said armature member only when the latter has moved beyond mid-position in either direction to open the circuit to the active magnet and to prepare the circuit of the inactive magnet for energization when closed by said control device, whereby the active magnet is not deenergized and the inactive magnet cannot be energized until said armature member is urged beyond the mid-point of its travel in the direction of its initial movement by the action of said resilient means.

ARNOLD H. BEEDE.